United States Patent
Naderer et al.

(10) Patent No.: US 12,126,233 B2
(45) Date of Patent: Oct. 22, 2024

(54) ELECTRIC MACHINE HAVING SEVERAL RIGID WINDING PIECES FORMED AS HOLLOW CONDUCTORS-HYDRAULIC CONNECTION CONCEPT II

(71) Applicant: DYNAMIC E FLOW GMBH, Valley (DE)

(72) Inventors: Michael Naderer, Salzburg (AT); Nikolaus Schweinert, Kaufbeuren (DE); Manuel Hartong, Kaufbeuren (DE)

(73) Assignee: dynamic E flow GmbH, Valley (DE)

( * ) Notice: Subject to any disclaimer, the term of this patent is extended or adjusted under 35 U.S.C. 154(b) by 461 days.

(21) Appl. No.: 17/295,605

(22) PCT Filed: Nov. 18, 2019

(86) PCT No.: PCT/EP2019/081680
§ 371 (c)(1),
(2) Date: May 20, 2021

(87) PCT Pub. No.: WO2020/104387
PCT Pub. Date: May 28, 2020

(65) Prior Publication Data
US 2022/0021260 A1    Jan. 20, 2022

(30) Foreign Application Priority Data
Nov. 20, 2018 (DE) .................... 10 2018 129 230.9

(51) Int. Cl.
*H02K 3/22* (2006.01)
*H02K 3/24* (2006.01)
*H02K 9/193* (2006.01)

(52) U.S. Cl.
CPC ................ *H02K 3/24* (2013.01); *H02K 3/22* (2013.01); *H02K 9/193* (2013.01)

(58) Field of Classification Search
CPC ............. H02K 3/22; H02K 3/24; H02K 9/193
(Continued)

(56) References Cited

U.S. PATENT DOCUMENTS 2,833,944 A  5/1958 Willyoung
2,929,943 A  3/1960 Richardson et al.
(Continued)

FOREIGN PATENT DOCUMENTS

DE   192 525 C     9/1906
DE   10 89 057 B   9/1960
(Continued)

OTHER PUBLICATIONS

International Search Report for PCT/EP2019/081680 dated Feb. 7, 2020.

*Primary Examiner* — Burton S Mullins
(74) *Attorney, Agent, or Firm* — Carter, DeLuca & Farrell LLP (57) ABSTRACT

The invention relates to an electric machine (1) having a rotor (3), a stator (2) and several rigid winding pieces (5) formed as hollow conductors, which form various coils of a winding (4) of the electric machine (1) and are each part of a cooling circuit of the electric machine (1). According to the invention, the winding pieces (5) each have at least one lateral tap (34) in the region of their end sections (8), via which tap a coolant can be fed into the winding pieces (5) or removed from the winding pieces (5).

20 Claims, 7 Drawing Sheets

(58) Field of Classification Search
USPC .......................................................... 310/54
See application file for complete search history.

(56) References Cited

U.S. PATENT DOCUMENTS

| | | | | |
|---|---|---|---|---|
| 3,614,493 | A * | 10/1971 | Collings | H02K 3/22 |
| | | | | 310/58 |
| 3,749,952 | A * | 7/1973 | Lambrecht | H02K 3/22 |
| | | | | 310/64 |
| 4,274,021 | A * | 6/1981 | Kamiya | H02K 3/22 |
| | | | | 310/260 |
| 5,489,810 | A * | 2/1996 | Ferreira | H02K 1/32 |
| | | | | 310/58 |
| 5,875,539 | A | 3/1999 | Kilpatrick et al. | |
| 6,102,105 | A * | 8/2000 | Moran | B29C 73/166 |
| | | | | 264/36.16 |
| 8,222,778 | B2 * | 7/2012 | Kabata | H02K 5/225 |
| | | | | 310/55 |
| 8,629,586 | B2 * | 1/2014 | Minemura | H02K 9/19 |
| | | | | 310/58 |
| 9,515,530 | B2 * | 12/2016 | Ho | H02K 9/227 |
| 10,211,704 | B2 * | 2/2019 | Tremelling | H02K 9/197 |
| 10,454,329 | B2 * | 10/2019 | Schweinert | H02K 9/193 |
| 2005/0247762 | A1 | 11/2005 | Breznak et al. | |
| 2013/0076167 | A1 * | 3/2013 | Lepres | H02K 1/20 |
| | | | | 310/54 |

FOREIGN PATENT DOCUMENTS

| | | | | |
|---|---|---|---|---|
| DE | 30 28 177 A1 | 2/1982 | | |
| DE | 102013205418 A1 | 4/2014 | | |
| DE | 102014110299 A1 * | 1/2016 | ............. | H02K 3/12 |
| DE | 102015012914 A1 | 4/2017 | | |
| GB | 1179553 A | 1/1970 | | |
| JP | S5131704 U | 3/1976 | | |
| JP | S5374203 A | 7/1978 | | |
| WO | WO2019145464 | * 8/2019 | ............. | H02K 1/20 |

* cited by examiner

ELECTRIC MACHINE HAVING SEVERAL RIGID WINDING PIECES FORMED AS HOLLOW CONDUCTORS-HYDRAULIC CONNECTION CONCEPT II

The invention relates to an electric machine having a rotor, a stator and several winding pieces formed as hollow conductors, which form various coils of a winding of the electric machine and are each part of a cooling circuit of the electric machine.

BACKGROUND OF THE INVENTION

Internally cooled electric machines are known from the prior art, the winding of which is produced using so-called pin or hairpin technology. Pins or hairpins are usually rigid winding pieces produced from copper which are inserted into grooves of the stator of the electric machine and which generate a magnetic field during operation of the electric machine. With internally cooled electric machines, the winding pieces are formed as hollow conductors, which comprise a continuous channel through which a coolant is led in order to cool the electric machine.

Rigid winding pieces known from the prior art usually have the shape of hairpins or rods. Known hairpins comprise, for example, two legs running substantially in parallel and a curved transition region, which connects the two legs to each other. On their outer surface, the known winding pieces are generally provided with an electrically insulating layer.

With such electric machines having a hollow conductor winding formed from rigid winding pieces, the hydraulic connection of the individual winding pieces, in particular, constitutes a technical challenge which presents sufficient space for improvement.

A device for cooling the circulating part of electric machines is known from DE 192 525 A, which device comprises pipes with openings through which air flows as soon as the electric machine is moved. Further electric machines having an internally cooled winding are known from DE 10 89 057 A, DE 30 28 177 A1 and US 2005/0 247 762 A1.

OBJECT OF THE INVENTION

It is thus an object of the present invention to create an electric machine having a hollow conductor winding formed from several rigid winding pieces, said hollow conductor winding being constructed particularly simply, in particular in relation to the hydraulic connection of the individual winding pieces.

This object is solved according to the invention by the features mentioned in the independent claims. Further embodiments of the invention emerge from the sub-claims.

According to the invention, an electric machine is proposed which comprises a rotor, a stator and several winding pieces formed as hollow conductors, said winding pieces forming various coils of a winding of the electric machine and each being part of a cooling circuit of the electric machine. In the region of their end sections, the individual winding pieces of the electric machine each have at least one lateral tap penetrating through their peripheral surface, via which tap a coolant can be fed into the winding pieces or removed from the winding pieces. This has the advantage that the individual end sections of the winding pieces can be electrically contacted e.g. by laser welding. Laser welding is a particularly simple, quick and cost-effective method, yet has the disadvantage that the channel running in the winding pieces is sealed and thus a through-transmission of coolant is no longer possible. If the lateral taps are located sufficiently far away from the respective welding point, the winding pieces can be fixed by laser welding without problems. The distance of the welding points from the lateral taps can be one or more centimetres, for example.

The individual winding pieces are preferably electrically contacted, in particular by laser welding, at a location which is closer to the end of the winding piece than the lateral tap.

The winding pieces each have two front-face ends, which are preferably sealed. In order to implement this, the front-face ends of the winding pieces can be simply squeezed together, for example.

The electric machine according to the invention further comprises a hydraulic connection part to which several of the winding pieces are hydraulically connected. The connection part preferably has at least one channel which is in fluid-technical connection with several of the winding pieces, such that a coolant can be fed into the individual winding pieces via the lateral taps or a coolant emerging from the lateral taps of the winding pieces can be collected in the at least one channel.

The channel mentioned above preferably runs in the region of the lateral taps and is fluidically connected to them.

In a specific embodiment, the hydraulic connection part has several ports in the form of openings, which are each formed to receive a single end section of a winding piece. This means that exactly one end section of a winding piece is connected to each port.

Said openings are preferably provided on at least one side of the hydraulic connection part pointing in the axial direction of the electric machine. Yet they can also be provided on both sides.

According to a preferred embodiment of the invention, the openings run through the hydraulic connection part, such that the end sections of the winding pieces can be plugged through the connection part.

The hydraulic connection part is preferably produced from an electrically insulating material. It is preferably formed annularly as a connection ring.

The connection region between the individual winding pieces and the hydraulic connection part is preferably sealed by means of a seal.

According to a specific embodiment of the invention, the hydraulic connection part comprises sealant lines, which lead to the individual openings and are designed in such a way that a sealant can be supplied in order to seal the openings. The sealant lines are preferably located on at least one face pointing in the axial direction, in which face the ports or openings are provided for the end sections of the winding pieces. According to a preferred embodiment of the invention, the sealant lines are formed as channels running in the surface of the connection part.

So that the sealant cannot emerge outwardly from the sealant lines, a covering plate is respectively provided on one or both sides of the hydraulic connection part. The covering plate preferably has apertures corresponding to the connection openings of the hydraulic connection part, such that the end sections of the winding pieces can be plugged through. One or both covering plates can here optionally also function as a contact plate in order to arrange individual winding pieces electrically in series.

The hydraulic connection part is preferably formed in several parts and comprises at least two partial connection parts, wherein the at least one internal channel is formed between the at least two partial connection parts adjacent to each other.

According to a specific embodiment of the invention, the hydraulic connection part comprises several sealant inlets, which lead to the openings via said sealant lines for connecting the end sections of the winding pieces.

The hydraulic connection part according to the invention preferably comprises a central coolant input, which is in fluidic connection with a first group of end sections of the winding pieces, and a central coolant output, which is in fluidic connection with a different second group of end sections of the winding pieces.

Said coolant input preferably communicates with at least one first channel, which is provided to feed coolant into the lateral taps of several end sections of winding pieces. Said coolant output, in contrast, preferably communicates with at least one second channel, which is provided to collect the coolant emerging out of the lateral taps of the end sections of several winding pieces.

With regard to the construction of the electric machine, it is to be noted that, starting from the winding of the electric machine, firstly a hydraulic connection part is provided for hydraulically connecting end sections of the winding pieces and then, lying further outwardly in the axial direction, an electrical contact arrangement follows for electrically connecting certain end sections to the phase ports.

The winding pieces of the electric machine are preferably all arranged hydraulically in parallel.

The hydraulic connection part can be produced, for example, from plastic but also from metal. Electrical insulation elements, for example, can be provided for electrically insulating the connected winding pieces in relation to the hydraulic connection part.

In an electric machine according to the invention, the end sections of the individual winding pieces are preferably arranged in several rows with different radii. They preferably end approximately at the same axial height, i.e. on an axial plane. The electric machine can thus be constructed particularly easily.

The hydraulic connection part mentioned above preferably comprises several peripheral channels for distributing or collecting coolant in or out of the individual winding pieces. At least one of these channels is preferably formed in such a way that it fluidically communicates with at least two rows of the end sections of the winding pieces.

An electric machine according to the invention preferably also comprises several contact rings, which are designed to respectively electrically connect several of the winding pieces to one of the external phase ports. With the aid of the contact rings mentioned above, it is particularly easily possible to contact the relevant ports of the coils or winding pieces and to connect to the respectively corresponding external phase port. This is particularly advantageous with such electric machines which have several coils arranged in parallel per phase (U, V, \A/), i.e. with which several coils arranged in parallel are allocated to each electrical phase or to each external phase port.

According to a preferred embodiment of the invention, a contact ring comprises several ports for electrically contacting winding pieces, wherein these ports are evenly distributed across the periphery of the contact ring.

According to a preferred embodiment of the invention, the electric machine also comprises a set of several distributor elements, of which in each case one is electrically in connection with one of the corresponding external phase ports. The distributor elements are preferably formed annularly as distributor rings.

Each of the distributor elements is preferably electrically connected to one of the contact rings mentioned above via several electrical connection elements. In this case, such an electric machine comprises: a set of distributor elements, which respectively distribute the current flowing via the external phase ports to several electrical connection elements, said electrical connection elements, which electrically connect the distributor elements and the contact rings, and said contact rings, which respectively contact a predetermined number of coils arranged in parallel. Starting from the external phase ports (L1, L2, L3), the current path in this case leads, via one distributor element in each case, several electrical connection elements and, in each case, one of the contact rings to the coils of the winding and then further to a reference potential (e.g. the zero point or a different phase).

Said electrical connection elements can be formed, for example, as rod-like elements. The connection elements preferably run roughly in the axial direction of the electric machine. Moreover, they are preferably arranged distributed evenly across the periphery of the electric machine.

The individual distributor elements preferably have different diameters, whereby the construction of the electrical wiring is simplified.

The contact and/or distributor elements are preferably arranged one next to the other in the axial direction of the electric machine.

A winding piece formed as a hollow conductor can, according to the invention, have the shape of a rod, for example. According to a different embodiment of the invention, a winding piece has the shape of a hairpin, wherein the winding piece comprises two legs and a curved transition region which connects the two legs to each other. The two legs are arranged substantially in parallel and preferably respectively have a profile which is adjusted to the cross-section of the corresponding groove in the stator. A winding piece according to the invention can be dimensioned, in principle, in such a way that it fills a groove on its own or together with one or more further winding pieces.

A winding piece according to the invention is preferably produced from copper, aluminium or an alloy of one of said materials. An electrically insulating layer is preferably provided on its outer face.

The individual coils of the winding are preferably formed from several rigid winding pieces, which are electrically arranged in series.

The distributor elements mentioned above, the contact rings and the electrical connection elements arranged between the distributor elements and the contact rings must, where appropriate, lead very high current densities. In order to improve the cooling of said components, it is provided according to a specific embodiment of the invention to also form the distributor elements and/or the contact rings and/or the connection elements as hollow conductors, along with the winding, such that a coolant can be guided through said components. The distributor elements, the contact rings and/or the connection elements thus themselves form a part of the cooling circuit of the electric machine, whereby this can be cooled particularly effectively.

Alternatively to the inner cooling system described above, said components can also be cooled from the outside. Thus, the components can be arranged in one or more chambers, for example, through which a coolant is guided.

In principle, each intensely thermally stressed component can be cooled by a corresponding guide or design of the coolant path. With a construction as hollow conductor, the individual components can be cooled from inside. Alternatively, the coolant can also be guided past outside, in order to cool the relevant component. The manner of cooling emerges from the technical demands and can be implemented easily by the person skilled in the art after practical consideration.

According to a preferred embodiment of the invention, the contact rings each have several arms on which in each case at least one of the winding pieces is electrically contacted.

The contact rings mentioned at the start can, as mentioned, be produced from solid metal. According to a different embodiment of the invention, the contact rings are produced from a circuit board material, which comprises conducting tracks that electrically contact individual winding pieces.

Moreover, these or optionally also other circuit boards can be provided to arrange several winding pieces in parallel, in order to form the coils of the electrical winding.

An electric machine according to the invention can also have at least one contact plate which has several passage openings through which the individual winding pieces are plugged, wherein the contact plate further comprises electrical connectors, via which certain winding pieces are arranged electrically in series, in order to form the coils of the electrical winding. The contact plate can be formed, for example, as a circuit board.

The electrical and hydraulic connection of the individual winding pieces is preferably carried out only on one side of the electric machine. Yet in the case of rod-shaped winding pieces, the electrical and/or hydraulic connection of the individual winding pieces can also be carried out on two sides or the electric machine or the winding.

According to a preferred embodiment of the invention, the end sections of the individual winding pieces are preferably arranged in several, in particular circular, rows. The end sections are here preferably arranged in parallel and preferably all point in the axial direction of the electric machine. The end sections preferably end roughly at the same axial height, i.e. roughly on the same plane. Thus, the electrical and hydraulic connection of the winding pieces is substantially simplified.

BRIEF DESCRIPTION OF THE DRAWINGS

The invention is explained in more detail below by means of the attached drawing. Here are shown:

FIG. 6 an enlarged sectional view of a hydraulic connection part having winding pieces plugged through;

Figure 1:
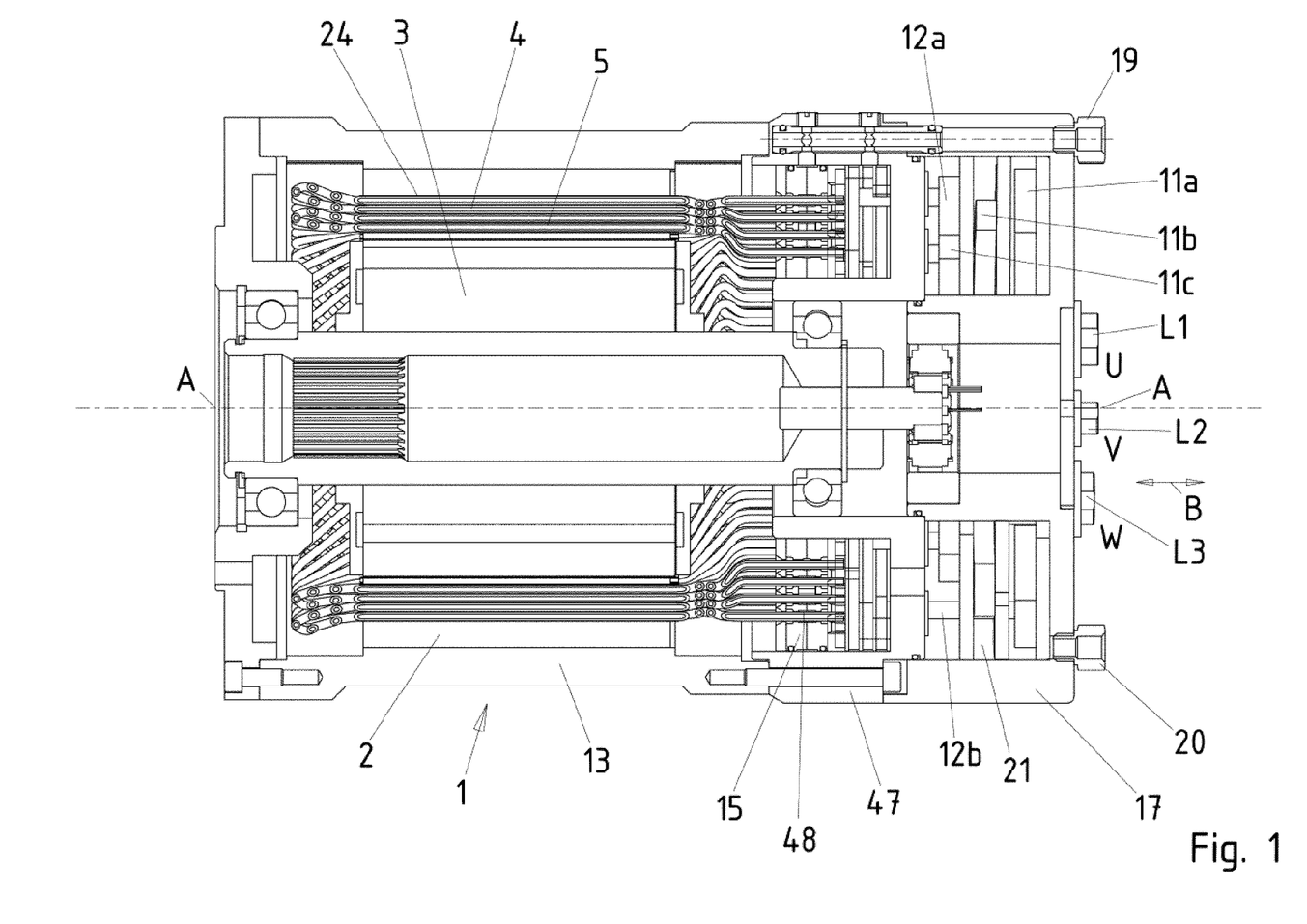
FIG. 1 a sectional view of an electric machine having a hydraulic connection part.

FIG. 1 shows a sectional view of an electric machine 1 having a stator 2, a rotor 3 and a winding 4 formed from several rigid winding pieces 5. The rigid winding pieces 5 are here formed as hollow conductors and comprise a penetrating channel 9, through which a coolant is guided in order to cool the electric machine 1. The individual winding pieces 5 are here arranged hydraulically in parallel and are each part of a cooling circuit of the electric machine 1.

In the exemplary embodiment of FIG. 1, the winding pieces 5 are each arranged individually in grooves 24 of the stator 2 of the electric machine 1. The cross-section of the winding pieces 5 is here adjusted to the cross-section of the grooves 24, such that they are substantially received without clearance in the grooves 24. Yet alternatively, more than one winding piece 5 per groove 24 could be provided.

An oil, therminol, galden or carbon dioxide can be used as the coolant, for example.

The electric machine 1 further comprises a housing 13 having a housing cover 17 in which all components of the electrical and hydraulic connection arrangement are housed.

Figure 2:
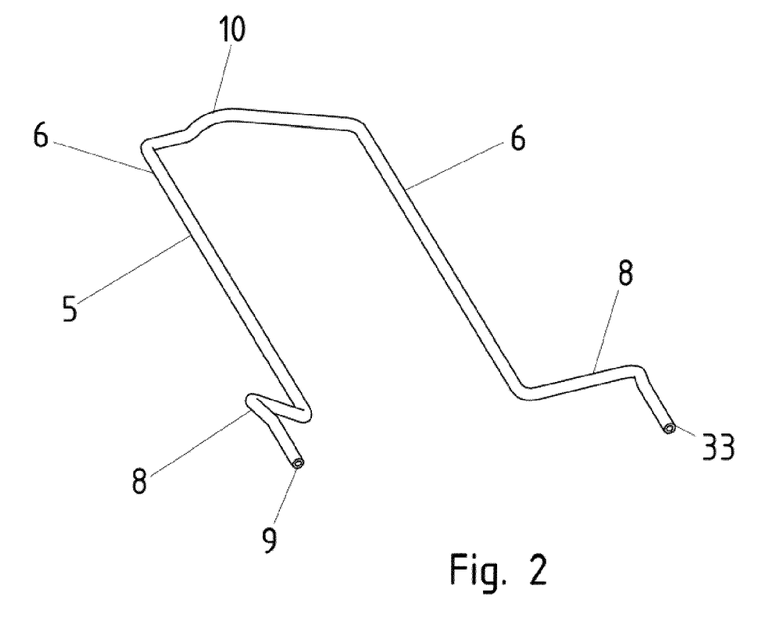
FIG. 2 a perspective view of a winding piece of an electric machine in the form of a hairpin.

In the electric machine 1 depicted in FIG. 1, the winding pieces 5 are designed as so-called hairpins, as is depicted by way of example in FIG. 2. The winding piece 5 depicted in FIG. 2 comprises two substantially parallel running legs 6 and a curved transition region 10, which connects the two legs 6 to each other. The depicted hairpin is formed as a hollow conductor and comprises a penetrating channel 9, which passes through from one end section 8 to the other end section 8 and through which a coolant is guided, in order to cool the winding 4 of the electric machine 1 during operation. The hairpin is respectively open on its front-face ends 33. One of the front-face ends 33 can thus be used as a coolant inlet and the other front-face end 33 as a coolant outlet.

The winding piece 5 depicted in FIG. 2 can be produced, for example, from copper. On its outer face, it is preferably provided with an electrically insulating layer.

The winding piece 5 can, for example, have a round or angular profile. The winding piece 5 can also have a different profile on different sections. According to a preferred embodiment, the profile on the end sections is round.

The electric machine 1 depicted in FIG. 1 is here designed with three phases and correspondingly has three external phase ports L1, L2 and L3, on which the electrical phases U, V and W abut. The winding 4 of the electric machine 1 is here designed in such a way that it respectively comprises several coils arranged in parallel for each electrical phase U, V and W. The individual winding pieces 5 are correspondingly 3 electrically interconnected in such a way that in each case several winding pieces are interconnected in series to a coil, and several such coils, which belong to the same electrical phase U, V, W, are arranged in parallel. According to a specific embodiment of the invention, each phase U, V, W can comprise, for example, eight parallel coils. The winding 4 of the electric machine can, of course, also have more or fewer coils arranged in parallel.

The end sections 8 of those winding pieces 5 that lie on the phase potential U, V, W are connected to the respectively corresponding external phase port L1, L2, L3 via an electrical contact arrangement, which will be elaborated on in more detail below.

Figure 3A:
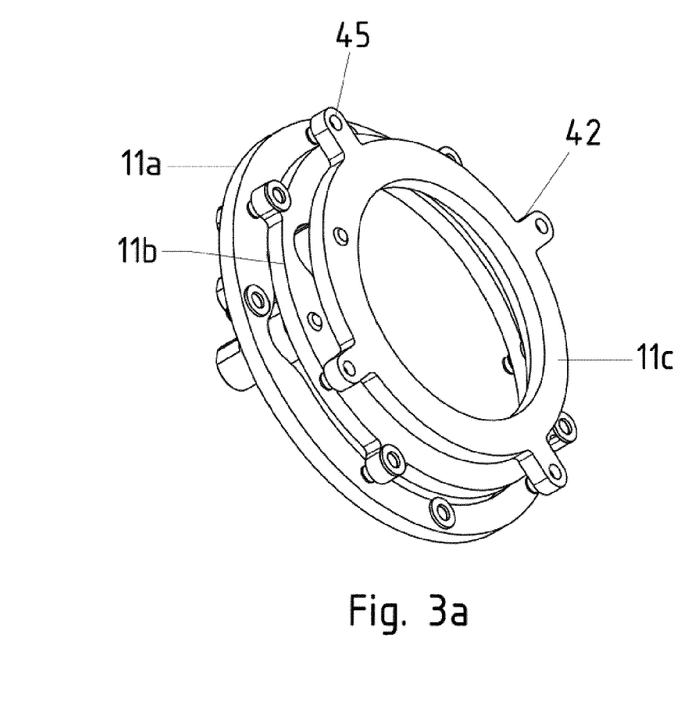
FIG. 3a, 3b different views of an arrangement of several distributor elements for distributing the current fed in at the external phase ports.
Figure 3B:
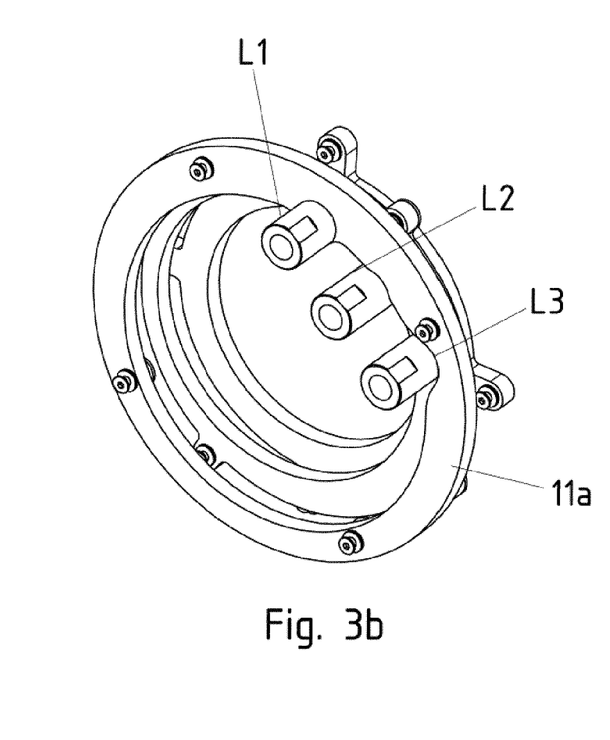

In this embodiment, said electrical contact arrangement comprises a set of three distributor elements 11a, 11 b, 11c, as is depicted by way of example in FIGS. 3a, 3b. Each of the distributor elements 11a, 11b, 11c is electrically connected to one of the external phase ports L1, L2, L3. In the depicted exemplary embodiment, the distributor element 11a is electrically connected to the phase port L1, the distributor element 11b to the phase port L2 and the distributor element 11c to the phase port L3. The three distributor elements 11a to 11c are arranged one next to the other in the axial direction B of the electric machine 1 and are electrically insulated from one another.

Each distributor element 11a, 11 b, 11c further comprises several receivers 45 for electrical connection elements 12a-12d, which are arranged preferably distributed evenly across the periphery of the distributor element. The individual distributor elements 11a, 11b, 11c substantially serve to distribute the current supplied at the phase ports L1, L2, L3 across the periphery of the electric machine 1 and to lead them to the subsequent contact rings 18a-18d. Each of the distributor elements 11a-11d is electrically connected to one respective contact ring 18a-18d via several electrical connection elements 12a-12d.

Figure 4A:
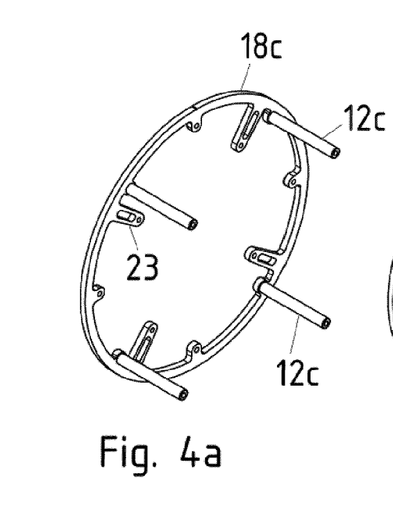
FIGS. 4a to 4c contact rings of the individual phases of an electric machine according to the invention.
Figure 4B:
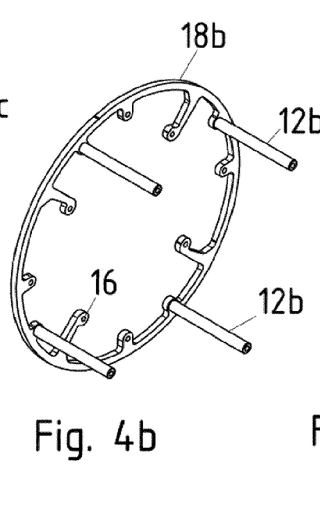
Figure 4C:
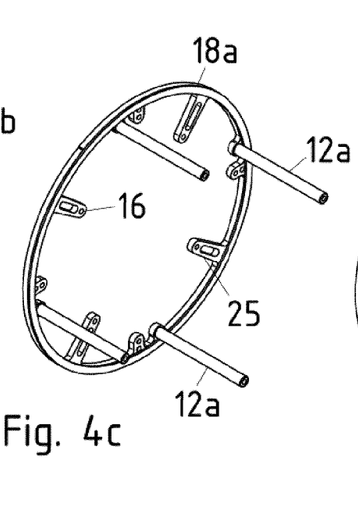

FIGS. 4a-4c show different contact rings 18a-18c according to a specific embodiment of the invention. The contact ring 18a is here electrically connected to the corresponding distributor element 11a and the phase port L1, the contact ring 18b to the corresponding distributor element 11b and the phase port L2, and the contact ring 18c to the corresponding distributor ring 11c and the phase port L3.

As can be seen in FIGS. 4a-4c, the electrical connection elements 12a-12c are each fixed on the corresponding contact rings 18a-18c and distributed evenly across the periphery of the contact rings 18a-18c. In the mounted state, the contact rings 18a-18c lie substantially transversely to the axial direction B of the electric machine 1, and the electrical connection elements 12a-12c run substantially in the axial direction B.

Each of the contact rings 18a-18c comprises several arms 23 for electrically contacting end sections 8 of the unwinding pieces 5 that lie on a certain electrical phase U, V or W. In the present exemplary embodiment, each contact ring 18a-18c comprises eight arms 23, in order to thus contact in each case one of eight winding pieces 5 from eight coils arranged in parallel. The arms 23 have a different length in order to contact end sections 8 of the winding pieces 5 lying radially further inwards or further outwards. Each arm 23 comprises a contact opening 16, through which the end section 8 of one winding piece 5 is inserted and soldered tightly.

With an electric machine 1 according to the invention, the end sections 8 of the individual winding pieces 5 are preferably arranged in several, in particular circular, rows. The end sections 8 of the winding pieces 5 are preferably arranged in parallel one next to the other and preferably all point in the axial direction B. The end sections 8 preferably all end at the same axial height, i.e. roughly on the same plane. This facilitates the electrical contacting of the individual winding pieces 5 and their hydraulic connection to the cooling circuit.

Figure 5:
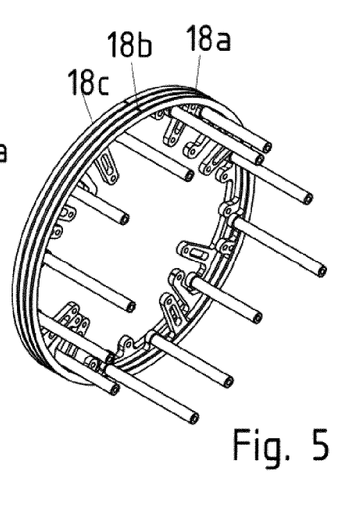
FIG. 5 an assembled contact ring arrangement of the contact rings of FIG. 4a-4c.

FIG. 5 shows the contact rings 18a-18b of FIG. 4a-4c in an assembled state. As can be seen, the individual contact rings 18a-18c are arranged one next to the other in axial direction B of the electric machine 1 and are here electrically insulated from one another.

Along with the electrical connection of individual winding pieces 5 to the respectively corresponding external phase connection L1, L2, L3, it is also necessary to interconnect certain winding pieces 5 in series with one another, in order to form the coils of the winding 4 of the electric machine 1. For the purposes of the serial interconnection, simple electrical conductors can be used, for example, which are soldered between the desired winding pieces.

Figure 6:
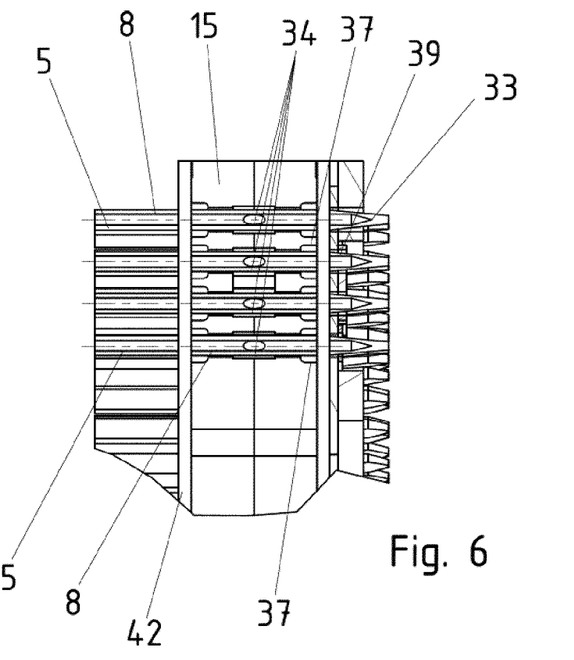
Figure 7:
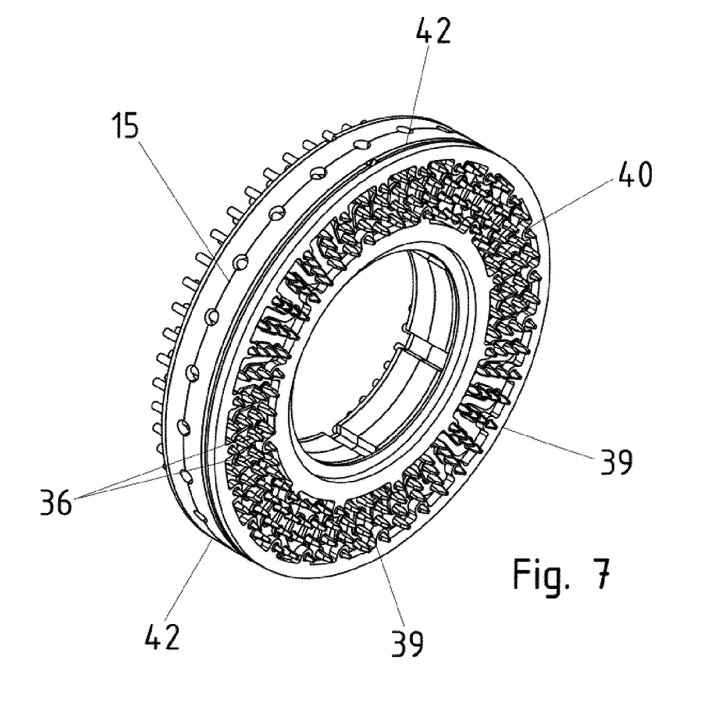
FIG. 7 a perspective view of the hydraulic connection part having two covering plates arranged thereon and a contact plate.

However, according to a preferred embodiment of the invention, an electrical contact plate 39 is provided with electrical connectors 40, as is depicted in FIG. 7. Before reference is made to this contact plate 39, firstly the hydraulic connection of the individual winding pieces 5 is elaborated on below:

As is shown in FIG. 6, the end sections 8 of the individual winding pieces 5 each have a lateral pin 34 which goes through the periphery and can be fed into the winding pieces via the coolant or from which the coolant can emerge. This has the advantage that the individual end sections 8 of the winding pieces 5 can be electrically contacted by laser welding. Laser welding is a particularly simple, quick and cost-effective method, yet has the disadvantage that the winding pieces 5 can be damaged during welding, such that the channel 9 running in the winding pieces 5 is closed and thus a line of coolant is no longer possible. If the lateral pins 34 are located sufficiently far away from the respective welding point, the winding pieces 5 can be fixed by laser welding without problem. The distance between the welding points and the lateral taps 34 can be, for example, one or more centimetres.

The lateral taps 34 can be produced e.g. by boring or grinding.

The individual end sections 8 are arranged in parallel and respectively run through a hydraulic connection part 15, which comprises several internally lying channels 31, 32, by means of which the coolant can be fed into the individual winding pieces 5 via the lateral taps 34 or coolant emerging from the winding pieces 5 is collected. The individual end sections 8 are here arranged in such a way that the lateral taps 34 substantially lie on the same plane in the region of a channel 31, 32 and communicate with this.

As can be seen in FIG. 6, the front-face ends 33 of the individual winding pieces 5 are closed. In order to achieve this, the front-face ends 33 of the winding pieces 35 are simply squashed, for example.

In each case, a covering plate 42 is arranged on the two outer faces, pointing in the axial direction B, of the hydraulic connection part 15, said covering plat being elaborated on in more detail below. Furthermore, a contact plate 39 is arranged on the side, depicted on the right in FIG. 6, of the hydraulic connection part 15, said contact plate serving to contact certain end sections 8 of the winding pieces 5 and to allow series connection corresponding to the electrical interconnection of the winding 4.

FIG. 7 shows a perspective view of the hydraulic connection part 15 having covering plates 42 arranged on both sides and the contact plate 39 described above. The hydraulic connection part 15, the two covering plates 42 and the contact plate 39 each have a plurality of passage openings 36, through which the end sections 8 of the individual winding pieces 5 run. As can be seen, the end sections 8 of the winding pieces 5 project through the entire arrangement and protrude outwardly beyond the contact plate 39. A plurality of electrical connectors 40 is provided on the outer surface of the contact plate 39 pointing in the axial direction B, via which certain winding pieces 5 are arranged in series. The end sections 8 of the winding pieces 5 are preferably electrically welded there. Such a contact plate 39 can also be provided with every other embodiment of the electric machine 1.

Figure 8A:
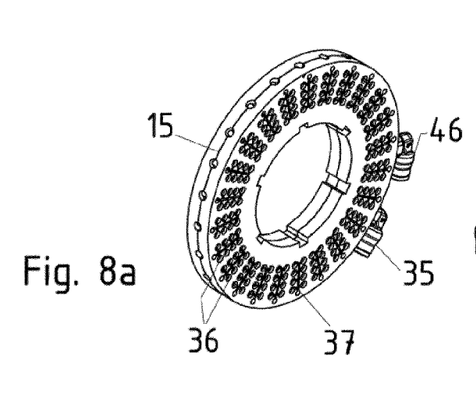
FIG. 8a, 8b different perspective views of the hydraulic connection part from FIG. 7.
Figure 8B:
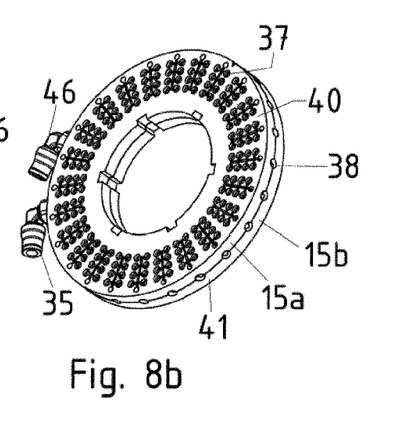

FIGS. 8a and 8b show different perspective views of the hydraulic connection part 15 from FIG. 7. The hydraulic connection part 15 comprises a plurality of passage openings 36, through which in each case one end section 8 of a winding piece 5 runs in the assembled state. The passage openings 36 run substantially in the axial direction B of the electric machine 1, whereby the end sections 8 of the winding pieces 6 are arranged substantially in parallel.

Furthermore, a central coolant input 46 and a central coolant output 35 are provided on the outer periphery of the hydraulic connection part 15, via which the coolant is supplied or removed.

As mentioned, various channels 31, 32 are arranged in the inner chamber of the hydraulic connection part 15 which fluidically communicate with the lateral taps 34 of the winding pieces 5 and via which the coolant is fed into the winding pieces 5 or the coolant emerging from the winding pieces 5 is collected. Said channels 31, 32 are depicted in more detail in FIGS. 9a and 9b.

According to an alternative embodiment of the invention, openings 36 for the end sections 8 of the winding pieces 5 could also be provided on only one side of the hydraulic connection part 15. In this case, the end sections 8 of the winding pieces 5 would end in the inner chamber of the hydraulic connection part 5. The hydraulic connection of the winding pieces 5 could nevertheless be implemented as described above.

On both faces, pointing in the axial direction B, of the hydraulic connection part 15, sealant lines 37 or channels are further provided, via which a sealant can be led to the individual passage openings 36. In this case, the sealant serves to seal the hydraulic connection part 15 from the outside.

Several sealant inputs 38 are located on the lateral peripheral face of the hydraulic connection part 15, via which sealant inputs the sealant can be injected into the sealant lines 37 or channels. The sealant inputs 36 communicate with the sealant lines 37 mentioned above, such that, when it is injected into the hydraulic connection part 15 via the sealant inputs 36, the sealant flows via the sealant lines 37 to the individual passage openings 36 for the winding pieces 5.

In this embodiment, the sealant lines 37 are formed as channels or grooves provided in the surface of the hydraulic connection part 15. So that the sealant does not leak out of the sealant lines 37, in each case one covering plate 42 is provided on both sides of the hydraulic attachment part 15. One or both of the covering plates 42 can here optionally also function as a contact plate 39, in order to arrange individual winding pieces 5 electrically in series.

Figure 9A:
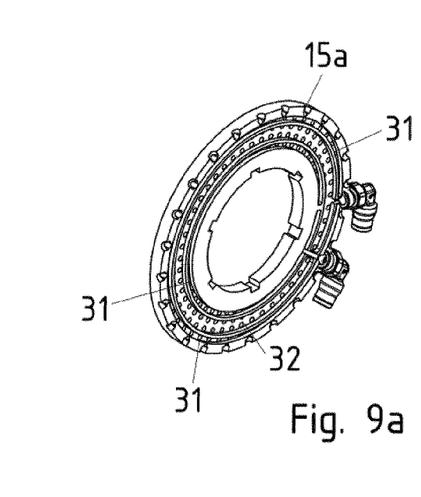
FIG. 9a, 9b the two partial rings of the hydraulic connection part shown in FIG. 8a, 8b.
Figure 9B:
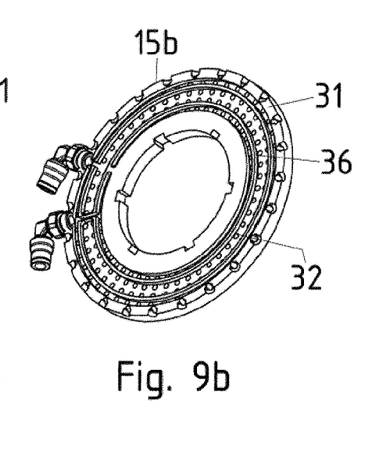

As can be seen in FIG. 9a, 9b, in this exemplary embodiment, the hydraulic connection part 15 is designed as a multi-part element that comprises two partial rings 15a, 15b, on the opposite sides of which in each case fluid channels 31, 32 are provided, via which the coolant is supplied or removed. The central channel 32 is here formed more widely than the channels lying radially outwards or radially inwards and correspondingly straddles two rows lying one next to the other of end sections 8 of the electrical winding pieces 5. The two other channels 31, in contrast, communicate only with one row of end sections 8 in each case. In this exemplary embodiment, the coolant is preferably supplied via the central channel 32 and removed via the two other channels 31. Yet the flow direction can also be changed at any time.

Figure 10A:
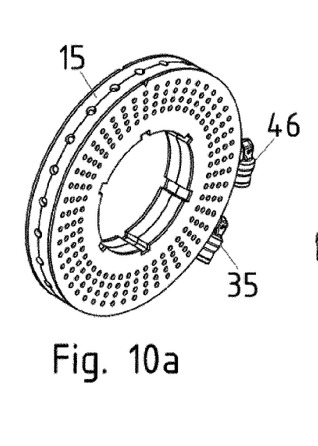
FIG. 10a, 10b perspective views of the hydraulic connection part depicted in FIG. 8a, 8b having covering plates arranged thereon.
Figure 10B:
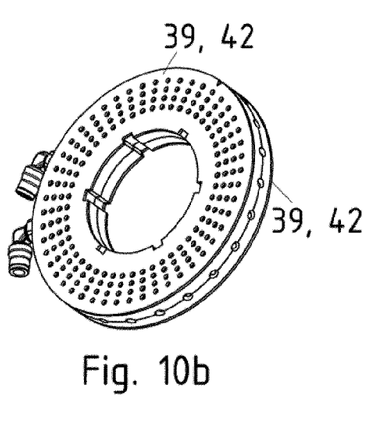

FIGS. 10a and 10b each show the assembled hydraulic connection part 15 with covering plates 42 arranged on both sides. The central coolant input 46 and output 35 can also be recognised.

Figure 11A:
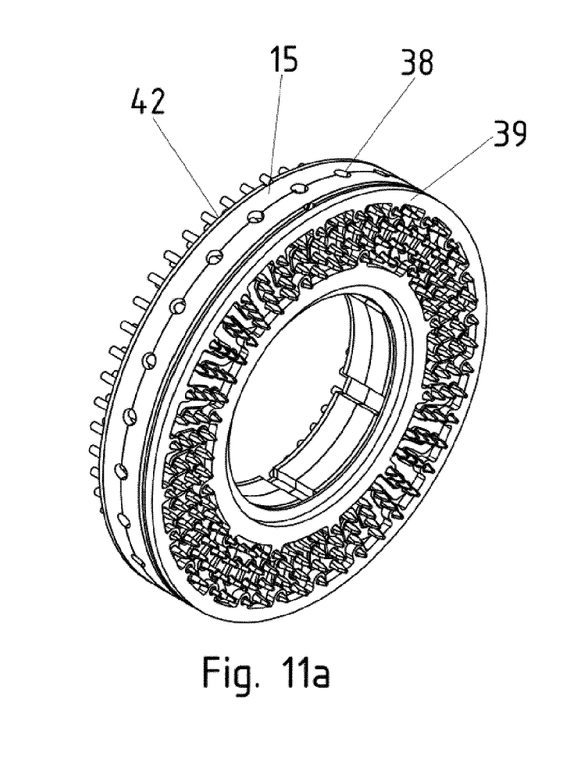
FIG. 11a, 11b perspective views of the arrangement from FIG. 10a, 10b having an additional electrical contact plate.
Figure 11B:
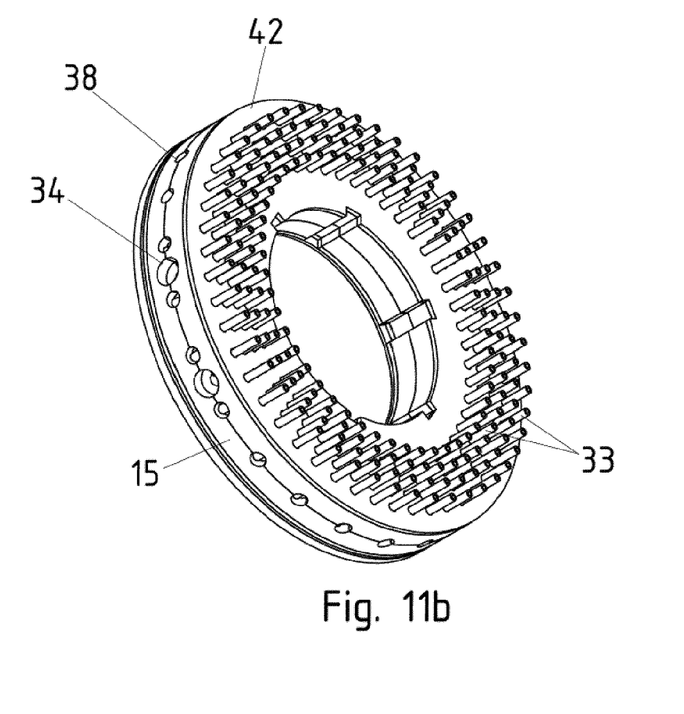

FIGS. 11a and 11b schematically show the whole arrangement of FIGS. 10a and 10b with an additionally placed contact plate 39 and a plurality of end sections 8 of the winding pieces 5.

In the exemplary embodiment depicted in FIG. 1 of the electric machine 1, the coolant flows into the electric machine 1 via a coolant input 19 provided on the housing 13 of the electric machine 1 and is supplied from there to the hydraulic connection part 15 via one or more channels. The coolant enters there from outside into the central coolant channel 32 via the coolant input 46 and is then fed into the end sections 8 of the winding pieces 5 fluidically connected to it via the lateral taps 34, runs through the individual winding pieces 5 and re-emerges at the two channels 31. From there, the coolant is led into a chamber 21, in which the distributor elements 11a-11c are located. The coolant finally re-emerges from the electric machine 1 at the coolant output 20.

Furthermore, a power electronic system of the electric machine 1 (not shown) can be integrated into the cooling circuit and cooled using the coolant. As a result of the corresponding design of the coolant path through the electric machine 1, in principle any components can be cooled, if desired. The person skilled in the art will correspondingly adjust the coolant path according to the requirements within the scope of their specialist knowledge.

The invention claimed is:

1. An electric machine, comprising:
a rotor, a stator and several rigid winding pieces formed as hollow conductors, which form various coils of a winding of the electric machine and are each part of a cooling circuit of the electric machine, wherein:
the winding pieces have internal channels defined therein for conveying fluid, the internal channels including closed ends, the winding pieces including at least one lateral tap defined through a wall of at least one hollow conductor and arranged at a distance from the closed ends in the region of their end sections, via which tap a coolant can be fed into the winding pieces or removed from the winding pieces;
a hydraulic connection part is provided, to which several of the winding pieces are connected,
the hydraulic connection part has at least one channel which is in fluidic connection with several of the winding pieces,
the lateral taps are arranged in the at least one channel such that the coolant can be fed from the at least one channel into the individual winding pieces via a respective lateral tap of the winding pieces, or a coolant exiting the lateral taps of the winding pieces can be collected in the at least one channel.

2. The electric machine according to claim 1, wherein the hydraulic connection part has several openings which are each formed for receiving an end section of a winding piece.

3. The electric machine according to claim 2, wherein the openings are provided on at least one side, pointing in the axial direction B of the electric machine, of the hydraulic connection part.

4. The electric machine according to claim 3, wherein the openings for the end sections of the winding pieces run through the hydraulic connection part in the axial direction B.

5. The electric machine according to claim 2, wherein the hydraulic connection part has sealant lines on at least one face pointing in the axial direction B, in which the openings for the end sections of the winding pieces are provided, said sealant lines leading to the individual openings and being designed in such a way that a sealant can be supplied via the sealant lines in order to seal the openings.

6. The electric machine according to claim 1, wherein the hydraulic connection part is produced from an electrically insulating material.

7. The electric machine according to claim 1, wherein the hydraulic connection part is formed in several parts and comprises at least two partial connection parts, wherein the at least one internal channel is formed between the at least two partial connection parts adjacent to each other.

8. The electric machine according to claim 1, wherein the hydraulic connection part comprises several sealant inputs which lead to openings for the end sections of the winding pieces via the sealant lines.

9. The electric machine according to claim 1, wherein the hydraulic connection part has a central coolant input, which is fluidically connected to a first group of end sections of the winding pieces, and a central coolant output which is fluidically connected to a different second group of end sections of the winding pieces.

10. The electric machine according to claim 9, wherein the central coolant input is in fluidic connection with at least one first channel, which is provided to feed coolant into the lateral taps of several end sections of winding pieces, and the coolant output is in fluidic connection with at least one second channel, which is provided to collect the coolant emerging from the lateral taps of the end sections of several winding pieces.

11. The electric machine according to claim 1, wherein, when seen in the axial direction B of the electric machine starting from the winding of the electric machine, firstly a hydraulic connection part is provided for hydraulically connecting end sections of the winding pieces and then an electrical contact arrangement follows for electrically connecting certain end sections with the phase ports.

12. The electric machine according to claim 11, wherein the electrical contact arrangement comprises several contact rings.

13. The electric machine according to claim 1, wherein a covering plate is arranged on at least one face of the hydraulic connection part pointing in the axial direction B of the electric machine.

14. An electric machine, comprising:
a rotor, a stator and several rigid winding pieces formed as hollow conductors, which form various coils of a winding of the electric machine and are each part of a cooling circuit of the electric machine, wherein:
the winding pieces have closed ends and at least one lateral tap arranged at a distance from the closed ends in the region of their end sections, via which tap a coolant can be fed into the winding pieces or removed from the winding pieces;
a hydraulic connection part is provided, to which several of the winding pieces are connected,
the hydraulic connection part has at least one channel which is in fluidic connection with several of the winding pieces,
the lateral taps are arranged in the at least one channel such that the coolant can be fed from the at least one channel into the individual winding pieces via a respective lateral tap of the winding pieces, or a coolant exiting the lateral taps of the winding pieces can be collected in the at least one channel,
wherein the hydraulic connection part has several openings defined on at least one side, pointing in the axial direction B of the electric machine, which are each configured to receive an end section of a winding piece, and wherein the openings for the end sections of the winding pieces run through the hydraulic connection part in the axial direction B.

15. An electric machine, comprising:
a rotor, a stator and several rigid winding pieces formed as hollow conductors, which form various coils of a winding of the electric machine and are each part of a cooling circuit of the electric machine, wherein:
the winding pieces have closed ends and at least one lateral tap arranged at a distance from the closed ends in the region of their end sections, via which tap a coolant can be fed into the winding pieces or removed from the winding pieces;
a hydraulic connection part is provided, to which several of the winding pieces are connected,
the hydraulic connection part has at least one channel which is in fluidic connection with several of the winding pieces,
the lateral taps are arranged in the at least one channel such that the coolant can be fed from the at least one channel into the individual winding pieces via a respective lateral tap of the winding pieces, or a coolant exiting the lateral taps of the winding pieces can be collected in the at least one channel,
wherein the hydraulic connection part is produced from an electrically insulating material.

16. An electric machine, comprising:
a rotor, a stator and several rigid winding pieces formed as hollow conductors, which form various coils of a winding of the electric machine and are each part of a cooling circuit of the electric machine, wherein:
the winding pieces have closed ends and at least one lateral tap arranged at a distance from the closed ends in the region of their end sections, via which tap a coolant can be fed into the winding pieces or removed from the winding pieces;
a hydraulic connection part is provided, to which several of the winding pieces are connected,
the hydraulic connection part has at least one channel which is in fluidic connection with several of the winding pieces,
the lateral taps are arranged in the at least one channel such that the coolant can be fed from the at least one channel into the individual winding pieces via a respective lateral tap of the winding pieces, or a coolant exiting the lateral taps of the winding pieces can be collected in the at least one channel,
wherein the hydraulic connection part is formed in several parts and comprises at least two partial connection parts, wherein the at least one internal channel is formed between the at least two partial connection parts adjacent to each other.

17. An electric machine, comprising:
a rotor, a stator and several rigid winding pieces formed as hollow conductors, which form various coils of a winding of the electric machine and are each part of a cooling circuit of the electric machine, wherein:
the winding pieces have closed ends and at least one lateral tap arranged at a distance from the closed ends in the region of their end sections, via which tap a coolant can be fed into the winding pieces or removed from the winding pieces;

a hydraulic connection part is provided, to which several of the winding pieces are connected, the hydraulic connection part has at least one channel which is in fluidic connection with several of the winding pieces, the lateral taps are arranged in the at least one channel such that the coolant can be fed from the at least one channel into the individual winding pieces via a respective lateral tap of the winding pieces, or a coolant exiting the lateral taps of the winding pieces can be collected in the at least one channel, wherein the hydraulic connection part comprises several sealant inputs which lead to openings for the end sections of the winding pieces via the sealant lines.

18. An electric machine, comprising:

a rotor, a stator and several rigid winding pieces formed as hollow conductors, which form various coils of a winding of the electric machine and are each part of a cooling circuit of the electric machine, wherein:

the winding pieces have closed ends and at least one lateral tap arranged at a distance from the closed ends in the region of their end sections, via which tap a coolant can be fed into the winding pieces or removed from the winding pieces;

a hydraulic connection part is provided, to which several of the winding pieces are connected, the hydraulic connection part has at least one channel which is in fluidic connection with several of the winding pieces, the lateral taps are arranged in the at least one channel such that the coolant can be fed from the at least one channel into the individual winding pieces via a respective lateral tap of the winding pieces, or a coolant exiting the lateral taps of the winding pieces can be collected in the at least one channel, wherein the hydraulic connection part has a central coolant input, which is fluidically connected to a first group of end sections of the winding pieces, and a central coolant output which is fluidically connected to a different second group of end sections of the winding pieces.

19. An electric machine, comprising:

a rotor, a stator and several rigid winding pieces formed as hollow conductors, which form various coils of a winding of the electric machine and are each part of a cooling circuit of the electric machine, wherein:

the winding pieces have closed ends and at least one lateral tap arranged at a distance from the closed ends in the region of their end sections, via which tap a coolant can be fed into the winding pieces or removed from the winding pieces;

a hydraulic connection part is provided, to which several of the winding pieces are connected, the hydraulic connection part has at least one channel which is in fluidic connection with several of the winding pieces, the lateral taps are arranged in the at least one channel such that the coolant can be fed from the at least one channel into the individual winding pieces via a respective lateral tap of the winding pieces, or a coolant exiting the lateral taps of the winding pieces can be collected in the at least one channel, wherein, when seen in the axial direction B of the electric machine starting from the winding of the electric machine, firstly a hydraulic connection part is provided for hydraulically connecting end sections of the winding pieces and then an electrical contact arrangement follows for electrically connecting certain end sections with the phase ports.

20. An electric machine, comprising:

a rotor, a stator and several rigid winding pieces formed as hollow conductors, which form various coils of a winding of the electric machine and are each part of a cooling circuit of the electric machine, wherein:

the winding pieces have closed ends and at least one lateral tap arranged at a distance from the closed ends in the region of their end sections, via which tap a coolant can be fed into the winding pieces or removed from the winding pieces;

a hydraulic connection part is provided, to which several of the winding pieces are connected, the hydraulic connection part has at least one channel which is in fluidic connection with several of the winding pieces, the lateral taps are arranged in the at least one channel such that the coolant can be fed from the at least one channel into the individual winding pieces via a respective lateral tap of the winding pieces, or a coolant exiting the lateral taps of the winding pieces can be collected in the at least one channel, wherein a covering plate is arranged on at least one face of the hydraulic connection part pointing in the axial direction B of the electric machine.

* * * * *